No. 673,730. Patented May 7, 1901.
C. SEBASTIAN.
IMPLEMENT FOR TURFING FABRICS.
(Application filed Jan. 14, 1901.)
(No Model.)
Fig. I. Fig. II. Fig. III. Fig. IV.
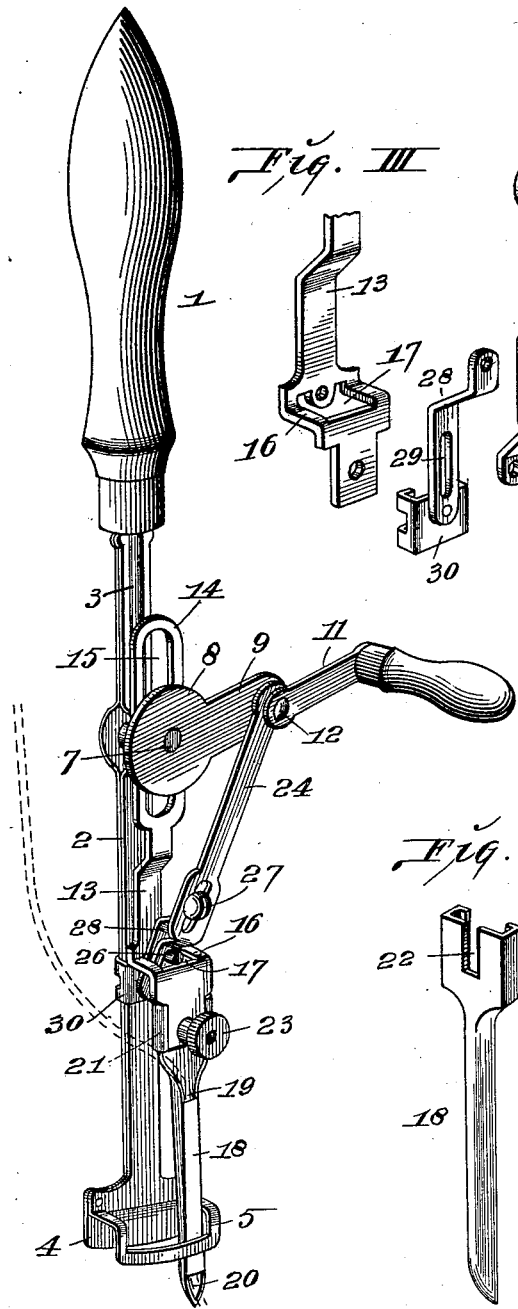
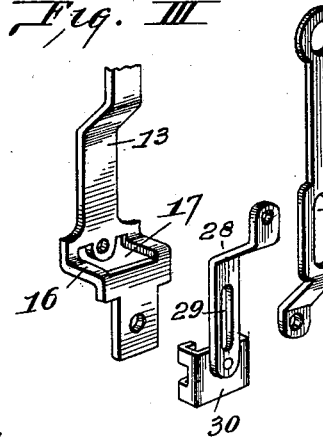
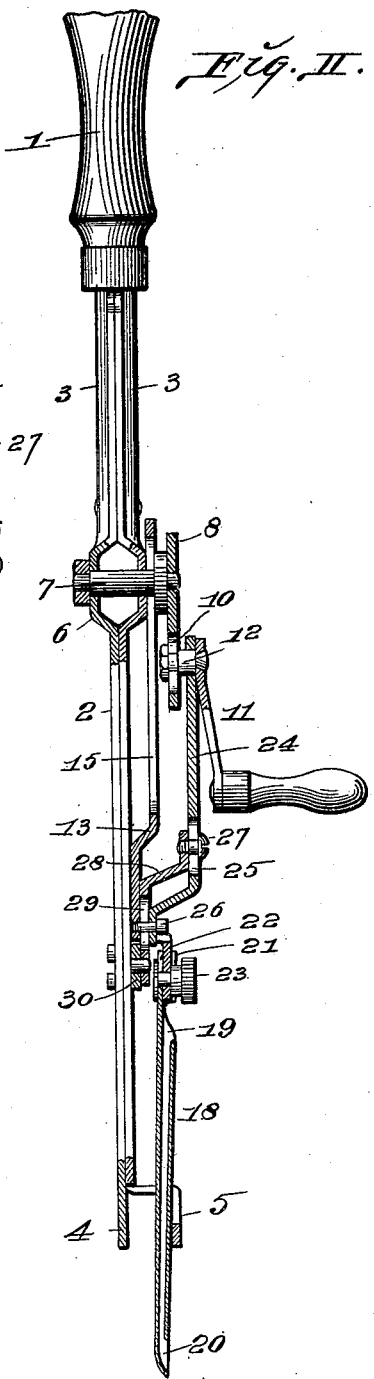
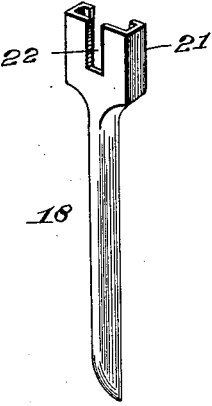
Attest:
N. P. Smith
E. S. Knight
Inventor:—
Charles Sebastian.
By Wright Bro
atty's
THE NORRIS PETERS CO., PHOTO-LITHO., WASHINGTON, D. C.

UNITED STATES PATENT OFFICE.

CHARLES SEBASTIAN, OF ST. LOUIS, MISSOURI, ASSIGNOR TO WILLIAM H. HENSCHEN AND FRANCIS M. HARTMAN, OF SAME PLACE.

IMPLEMENT FOR TURFING FABRICS.

SPECIFICATION forming part of Letters Patent No. 673,730, dated May 7, 1901.

Application filed January 14, 1901. Serial No. 43,153. (No model.)

*To all whom it may concern:*

Be it known that I, CHARLES SEBASTIAN, a citizen of the United States, residing in the city of St. Louis, in the State of Missouri, have invented certain new and useful Improvements in Implements for Turfing Fabrics, of which the following is a full, clear, and exact description, reference being had to the accompanying drawings, forming part of this specification.

My invention relates to that class of implements used in making rugs by stitching yarn through a suitable fabric, such as canvas, so that the yarn will lie in tufts or folds at the sides of the rug.

The invention consists in features of novelty hereinafter fully described, and pointed out in the claims.

Figure I is a perspective view of the implement. Fig. II is a view looking at the edge of the implement and showing the operating parts in longitudinal section. Fig. III shows working parts of the implement in perspective and disconnected from each other. Fig. IV is an enlarged perspective view of the needle.

1 designates the handle of the implement, suitably applied to the shank 2. The shank is preferably of two bars riveted or otherwise suitably fastened together and preferably provided with strengthening-ribs 3 near the handle in order to afford rigidity in the shank at the point where the greatest strain occurs in the use of the implement. The lower end of the shank is provided with a foot formed by a widened portion 4 on one of the bars and a loop 5, that projects from the other bar. The bars of the shank are bowed outwardly at 6 and receive a drive-shaft 7, that is journaled therein. Mounted on the shaft 7 is a disk 8, having an arm 9, containing a slot 10.

11 is a crank that is carried by an adjustment-bolt 12, movably arranged in the slot 10 of the disk-arms 9.

13 designates a needle-carrier provided with a guide 14, containing a slot 15, through which the shaft 7 passes, the said shaft serving to guide the carrier in its reciprocation during the operation of the implement. The carrier is bent outwardly at 16 and is provided with an opening 17.

18 designates the tubular needle, which is open at its upper end at 19 and at its lower end at 20. This needle is enlarged at its inner end and formed with a socket 21, that receives the lower end of the carrier 13, that is provided with a slot 22, that receives a clamp-bolt 23, mounted in the end of the carrier and by which the needle is removably attached to the carrier.

24 designates a link, one end of which is loosely mounted on the adjustment-bolt 12, that connects the crank 11 to the arm of the disk 8, and the other end of which is connected to the carrier 13 by a screw or pin 26, the introduction of said link providing for the reciprocation of the needle-carrier upon the turning of the crank 11 and the rotation of the disk 8. The link 24 is provided with a longitudinally-extending slot 25, that receives an adjustment-screw 27, that is connected to a throw-bar 28, provided with a slot 29. The throw-bar 28 is adjustably connected to the link 24 by said screw 27, so that it may be moved longitudinally with relation to the link, and the slot 29 receives the screw 26, that connects the link 24 to the carrier 13 to permit the adjustment of the throw-bar 28. The throw-bar 28 is connected to a slide 30, adapted to move on the shank of the implement.

In the operation of the implement the throw-bar 28 operates in a rocking manner in the opening 17, contained by the carrier 13, and permits lateral movement of the lower end of the carrier to carry the needle from side to side within the loop 5 of the foot of the implement, while the slide 30 guides the throw-bar, and consequently the carrier by which the needle 18 is carried. To adjust the extent of lateral throw of the needle, the throw-bar 28 is adjusted longitudinally with relation to the link 24 by moving the screw 27 in the longitudinal slot 25 in said link. On moving the throw-bar downwardly and forwardly with relation to the link 24 the connection by the adjustment-screw 27 to the link 24 is moved toward the point of pivot between the link 24 and the carrier 13, and thereby providing for an increased lateral throw of the lower end of the needle 18, owing to the adjustment of the throw-bar permitting increased throw of the lower end of the link 24. By this arrangement the width of stitch taken by the needle is increased. Upon moving the throw-bar in the opposite direction the lateral throw of the needle is diminished according to the degree of adjustment of the throw-bar with relation to the link 24. The adjustable connection between the inner or upper end of the link 24 and the arm 9 of the disk 8 by moving the adjustment-bolt 12 provides for variation in the length of stroke of the needle 18. By moving the adjusment-bolt 12 inwardly in the slot of the arm 9 toward the axis of the disk the length of stroke of the needle is diminished by reason of the decrease in the length of connection by the disk 8 and link 24 between the drive-shaft 7 and the pivot that connects the needle-carrier 13 and the link 24, whereas by moving the adjustment-bolt in the opposite direction the length of stroke of the needle is increased, as will be readily understood.

I claim as my invention—

1. In a turfing implement, the combination of a shank, a needle, a carrier to which said needle is affixed, means for reciprocating said carrier, comprising a throw-bar connected to said carrier-reciprocating means, and means whereby said throw-bar is slidingly connected to said shank, substantially as described.

2. In a turfing implement, the combination of a shank, a needle, a slotted reciprocating carrier to which said needle is affixed, a drive-shaft arranged to receive said slotted carrier to guide it, and means connecting said drive-shaft and said carrier and by which said carrier is reciprocated, substantially as described.

3. In a turfing implement, the combination of a shank, a needle, a reciprocating carrier to which said needle is affixed, a drive-shaft, a rotary member carried by said drive-shaft, a link having pivotal connection with said carrier and said rotary member, and a throw-bar adjustably fixed to said link and a slide pivoted to said throw-bar and arranged to travel on said shank, substantially as described.

4. In a turfing implement, the combination of a shank, a reciprocating carrier, a needle affixed to said carrier, a drive-shaft, a rotary member carried by said shaft, a link pivoted to said carrier, means whereby said link is adjustably connected to said rotary member, a throw-bar adjustably connected to said link, and a slide carried by said throw-bar adapted to travel on said shank, substantially as described.

CHARLES SEBASTIAN.

In presence of—
 E. S. KNIGHT,
 M. P. SMITH.